United States Patent [19]

Friedle

[11] Patent Number: 4,550,978
[45] Date of Patent: Nov. 5, 1985

[54] THREE-DIMENSIONAL VIEWING DEVICE
[76] Inventor: Alvin A. Friedle, 5579 S. 2700 West, Roy, Utah 84067
[21] Appl. No.: 607,804
[22] Filed: May 7, 1984
[51] Int. Cl.⁴ .......................... G02B 7/18; G02B 27/22
[52] U.S. Cl. ..................................... 350/138; 350/143; 350/618
[58] Field of Search ............... 350/138, 137, 143, 133, 350/130, 618, 623, 626, 145; 354/103, 117; 352/60; 358/91

[56] References Cited
U.S. PATENT DOCUMENTS
672,609  4/1901  Young ................................. 350/141

FOREIGN PATENT DOCUMENTS
346679  4/1931  United Kingdom ................. 352/60

Primary Examiner—Jon W. Henry
Attorney, Agent, or Firm—Norman B. Rainer

[57] ABSTRACT

A hand-held viewing device is provided which creates a stereoscopic illusion when flat subject matter is viewed. The device is comprised of a housing which defines two parallel and identical rectangular channels in contiguous side-by-side juxtaposition, and confines first and second flat reflectors which shift upwardly the line of sight through said channels.

4 Claims, 4 Drawing Figures

THREE-DIMENSIONAL VIEWING DEVICE

BACKGROUND OF THE INVENTION

This invention relates to a viewing device which causes flat, two-dimensional pictures to be perceived by the user as having depth as a third dimension.

It has long been known that flat pictures, whether stationary or moving, can be made to have a three-dimensional effect using special techniques and equipment. For example, in stereoscopic optical methods, two different pictures are made of the same scene or object at a horizontally separated spacing equivalent to human eye spacing, and the resultant pictures are separately viewed by each appropriate eye. In stereoscopic viewers for still photographs, the two different photographs are mounted in side-by-side relationship and viewed through a lens or aperture system that causes each of the viewer's eyes to see separate pictures. Since the eyes thereby see the object in the same manner as originally "seen" by the camera which produced the pictures, a stereoscopic three-dimensional effect is produced.

In the case of moving pictures, the two views taken of a given scene by two lenses laterally separated by human eye separation distance are projected onto the same viewing screen in superimposed juxtaposition. Each view is, however modified so as to facilitate separate perception by the eyes of the viewer. The views may, for example, be projected through polarizing filters mounted in orientations 90° apart. When the person who watches the moving picture wears special glasses having two different polarizing filters, each eye sees the appropriate one of the two views, thereby providing a depth perception or stereoscopic visual effect.

The aforementioned techniques for stereoscopic visual effects are expensive and difficult to achieve. Consequently, relatively little is done to provide large-scale publicly accessible stereoscopic viewing, such as television programming or motion pictures.

It is accordingly an object of the present invention to provide a viewing device which will cause flat subject matter to be perceived as having depth as a third dimension.

It is a further object of this invention to provide a device as in the foregoing object of simple and rugged construction which may be economically manufactured.

These objects and other objects and advantages of the invention will be apparent from the following description.

SUMMARY OF THE INVENTION

The above and other beneficial objects and advantages are accomplished in accordance with the present invention by a viewing device having critically interactive new features comprising:

(a) an elongated housing of generally rectangular crosssectional contour having a partially open eye-directed extremity and fully open subject-directed extremity, upper and lower surfaces and opposed side panels, and a plane of symmetry that extends in the direction of elongation and perpendicularly bisects said upper and lower surfaces, (b) a divider panel positioned within said housing and perpendicularly disposed between upper and lower surfaces within said plane of symmetry in a manner to form two separate and identical viewing channels of rectangular cross-sectional configuration, (c) first flat reflector means mounted at that extremity of each of said viewing channels which is closest to the eye-directed extremity of the housing, said reflector means being perpendicularly disposed between said panels and forming an upwardly opening angle of about 135° with respect to the center axis of elongation of each viewing channel, and (d) second flat reflector means mounted directly above said first reflector means and parallel thereto, and adapted to receive light from said first reflector means and re-direct said light out of the eye-directed extremity of said housing on a path parallel to the axes of said channels.

It has been found that, in order to produce the proper stereoscopic effect, the ratio of the length of said channels to the diagonal of their cross sections should be between 3.0 and 6.0. Also, the distance of separation between the center axes of elongation of the channels and the re-directed light path is preferably between 1 and 3 inches.

When the device is held close to the user's eye in a manner such that the subject-directed extremity is pointed toward a two-dimensional picture, whether still or moving, the user will perceive a three-dimensional quality with respect to said picture.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

Figure 2:
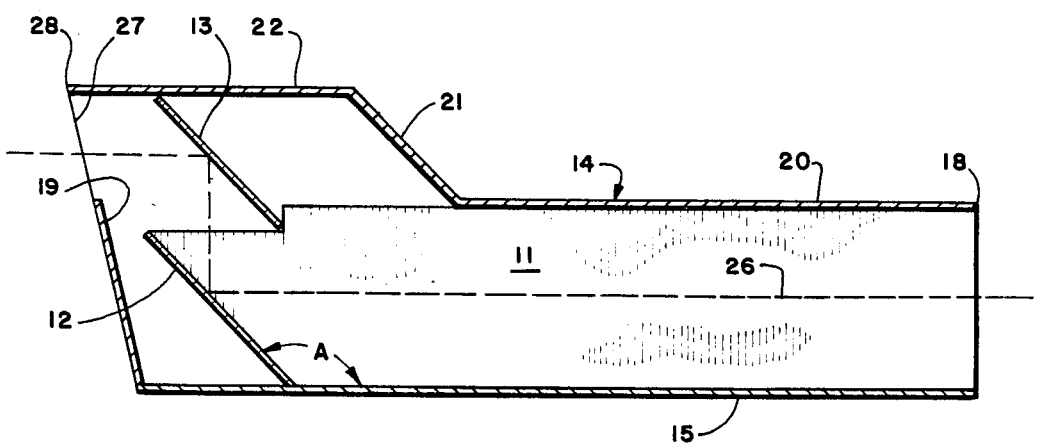
FIG. 2 is a sectional side view of the device of FIG. 1.

For convenience of description the expressions "front" or "forward" and "back" or "rear" or words of similar import, will refer to the right and left extremes, respectively, of the device shown in FIG. 2. Similarly, the expressions "upper" and "lower" or words of similar import will refer to the upper and lower extremities, respectively, of the device shown in FIG. 2.

DESCRIPTION OF THE PREFERRED EMBODIMENT

Figure 1:
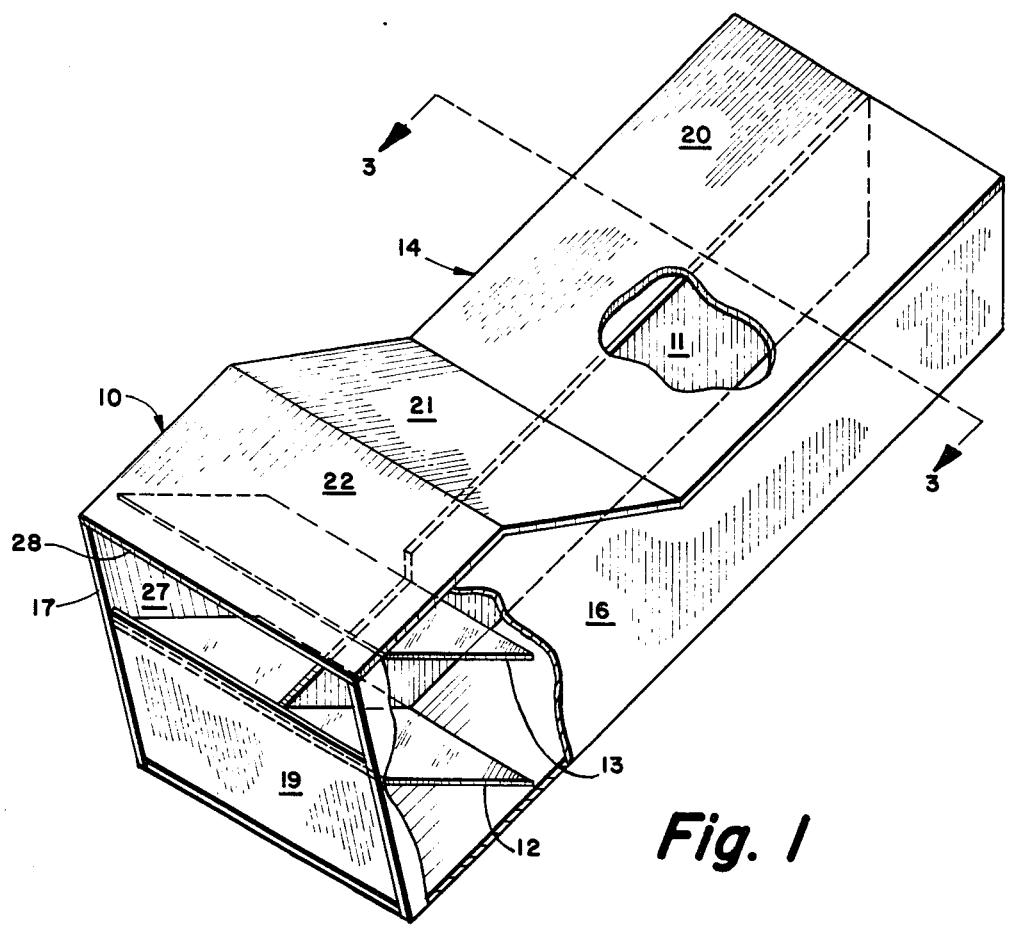
FIG. 1 is a perspective view of an embodiment of the device of the present invention with portions cut away to reveal interior details.
Figure 3:
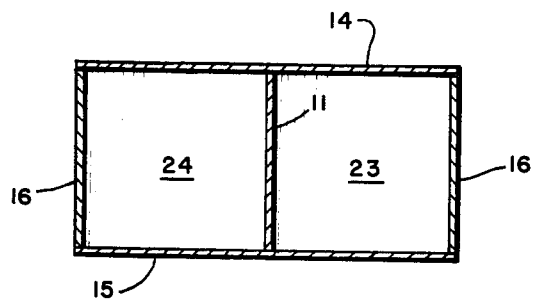
Figure 4:
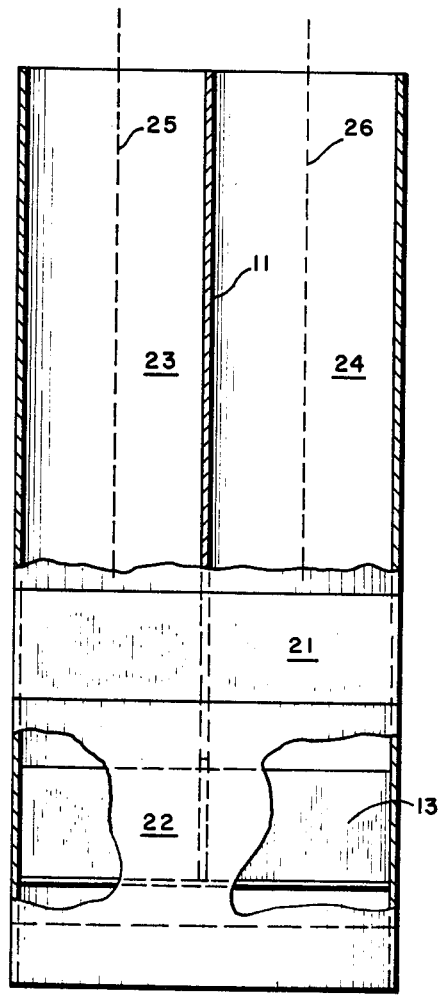
FIG. 4 is a top view of the device of FIG. 1 with portions cut away.

Referring to FIGS. 1-3, an embodiment of the viewing device of this invention is shown comprised of housing 10 containing divider panel 11, a first flat reflector in the form of mirror 12, and a second flat reflector in the form of mirror 13.

Housing 10 is fabricated of lightweight rigid panel material such as plastic, wood, cardboard, thin sheet metal or composite materials. The panels may be interengaged by adhesives or other suitable means which will not impair the functionality of the device. The housing is an elongated structure comprised of upper surface 14, bottom panel 15, and opposed side panels 16. The cross-sectional configuration of the housing, taken in planes perpendicular to the direction of elongation, is rectangular. The front or subject-directed extremity 18 of housing 10 is fully open. The rear or eye-directed extremity 17 of said housing is partially blocked by end panel 19 which extends upwardly from bottom panel 15. Upper surface 14 of the illustrated embodiment is comprised of forward panel 20, intermediate panel 21, and rearward panel 22. However, in other embodiments, upper surface may be a single flat panel disposed parallel to bottom panel 15.

A first flat reflector in the form of rectangular mirror 12 is disposed perpendicularly between side panels 16 which supportively position said mirror. Mirror 12 is further disposed so as to form with bottom panel 15 an upwardly opening angle A, shown in FIG. 2, having a value of 135°. A second flat reflector in the form of rectangular mirror 13 is disposed directly above mirror 12 and in parallel juxtaposition therewith. Mirror 13 extends perpendicularly between side panels 16 which support said mirror. The upper edge of mirror 13 is in contact with the underside of panel 22. The lower edge of mirror 12 is in contact with the upper side of bottom panel 15.

Divider panel 11 causes the forward portion of the housing to be divided into left and right viewing channels 23 and 24, respectively, each of uniform rectangular cross-sectional configuration, and having a center axis of elongation 25 and 26, respectively. The forward extremity of divider panel 11 terminates in flush or coplanar relationship with front extremity 18 of the housing. The rear extremity of divider panel 11 abuts against first or lower mirror 12.

It is to be noted that the arrangement of the divider panel in conjunction with the positioning of the flat reflector is such that the path of light rays along axes 25 and 26, shown by the dashed line of FIG. 2, is first diverted upwardly and then diverted in a direction parallel to axes 25 and 26 at a height to emerge through exit aperture 27.

When the user of the device places rear edge 28 of panel 22 against his forehead, and looks through aperture 27, the vision of each eye is constrained to a path along each channel. When flat subject matter is viewed in such manner, a stereoscopic effect is perceived.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A viewing device for creating a stereoscopic effect comprising:
   (a) an elongated housing of generally rectangular cross-sectional contour having a partially open eye-directed extremity and fully open subject-directed extremity, upper and lower surfaces and opposed side panels, and a plane of symmetry that extends in the direction of elongation and perpendicularly bisects said upper and lower surfaces,
   (b) a divider panel positioned within said housing and perpendicularly disposed between upper and lower surfaces within said plane of symmetry in a manner to form two separate and identical viewing channels of rectangular cross-sectional configuration,
   (c) first flat reflector means mounted at that extremity of each of said viewing channels which is closest to the eye-directed extremity of the housing, said reflector means being perpendicularly disposed between said panels and forming an upwardly opening angle of about 135° with respect to the center axis of elongation of each viewing channel, and
   (d) second flat reflector means mounted directly above said first reflector means and parallel thereto, and adapted to receive light from said first reflector means and re-direct said light out of the eye-directed extremity of said housing on a path parallel to the axes of said channels.

2. The viewing device of claim 1 wherein said flat reflector means are single integral mirrors which span both viewing channels.

3. The viewing device of claim 2 wherein the ratio of the length of said channels to the diagonal of their cross sections is between 3.0 and 6.0.

4. The viewing device of claim 3 wherein the distance of separation between the center axes of elongation of the channels and the re-directed light path is between 1.0 and 3.0 inches.

* * * * *